F. B. MacCARTHY.
PROCESS FOR TREATING ORES OF ALUMINUM, ESPECIALLY ALUNITE.
APPLICATION FILED FEB. 16, 1920.

1,413,045.
Patented Apr. 18, 1922.

INVENTOR:
Florence Brandé MacCarthy
By Attorneys,
Fraser, Park & Myers

UNITED STATES PATENT OFFICE.

FLORENCE BRANDÉ MacCARTHY, OF MARYSVALE, UTAH, ASSIGNOR TO MINERAL AND CHEMICAL COMPANY OF UTAH, OF SALT LAKE CITY, UTAH, A CORPORATION OF UTAH.

PROCESS FOR TREATING ORES OF ALUMINUM, ESPECIALLY ALUNITE.

1,413,045. Specification of Letters Patent. Patented Apr. 18, 1922.

Application filed February 16, 1920. Serial No. 359,165.

*To all whom it may concern:*

Be it known that I, FLORENCE BRANDÉ MACCARTHY, a citizen of the United States of America, residing in Marysvale, Piute County, Utah, U. S. A., have invented certain new and useful Improvements in Processes for Treating Ores of Aluminum, Especially Alunite, of which the following is a specification.

This invention relates to a process and apparatus for treating sulfur containing ores of aluminum, especially alunite, and aims to provide improvements therein.

Alunite is an ore which is a complex sulphate of potassium and aluminum, containing water of crystallization, and also minor quantities of silicon and iron. Its empirical formula is usually written—

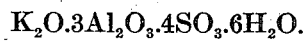
$$K_2O.3Al_2O_3.4SO_3.6H_2O.$$

Alunite or other ores of aluminum, in which the aluminum occurs as an oxidizable compound, when calcined, in the presence of oxygen, have the aluminum converted into an insoluble refractory oxide, and the alunite ore is usually treated simply for the recovery of its potash contents, the aluminum content being rendered into an un-workable form.

The present invention provides a process whereby the aluminum values of alunite and similar ores may be recovered as well as the potash values.

The invention further provides an apparatus for treating ores, and useful in conjunction with the present process.

An embodiment of the apparatus is illustrated in the accompanying drawings.

In said drawings.

Figure 1:
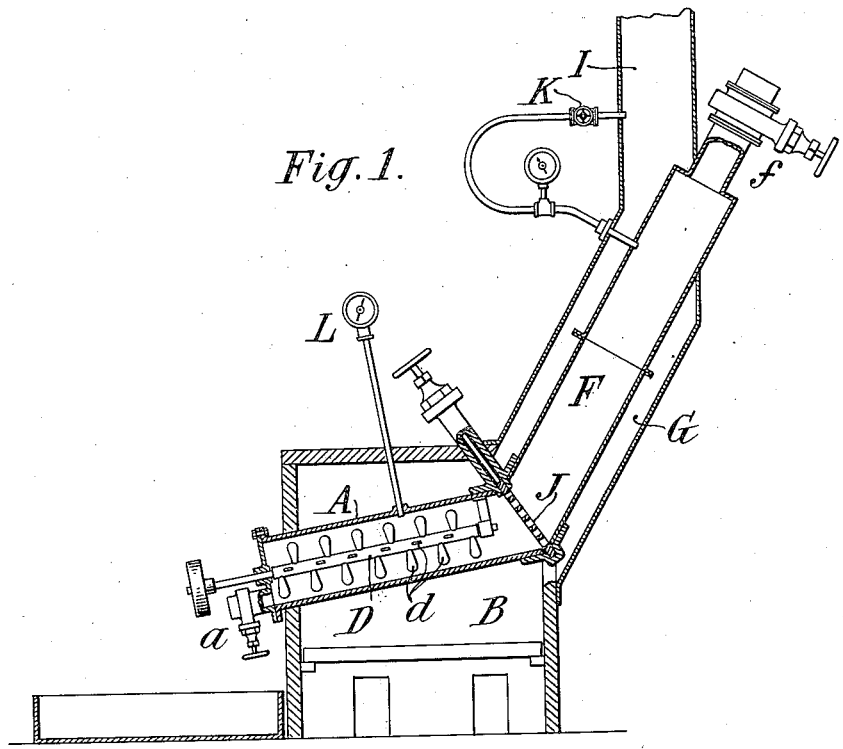
Figure 1 is a vertical sectional view of said embodiment.
Figure 2:
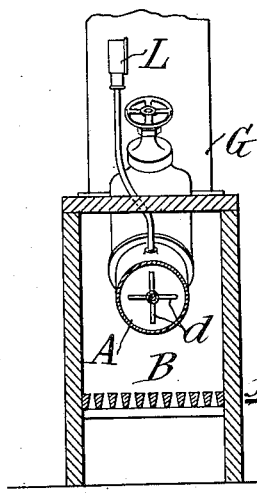
Fig. 2 is a sectional view at right angles to that in Fig. 1.

The apparatus comprises a heating chamber or retort A, preferably cylindrical in cross section, within a furnace or heater B. One end of the retort A preferably projects outside of the furnace, and is closed by a gate *a*, which is adapted to tightly close the end of the retort A. The retort A is so constructed as to stand considerable pressure, as for example, a pressure of 100 pounds per square inch. Inside of the retort A there is arranged an agitator D, conveniently in the form of a shaft having a plurality of blades or paddles *d* thereon. The retort A is preferably arranged at an incline. The blades *d* of the agitator are set at an angle upon the shaft, and the agitator D is preferably revolved in a direction which causes the blades to force the material in the retort A upward. The whole mass of material in the retort A does not, however, move toward the upper end of the retort A, the action of the blades being simply to mix and to move the material immediately in contact therewith upwardly, the material partly falling back after the blades pass. By revolving the shaft in the opposite direction, the blades may be made to assist in quickly emptying the retort, thereby conserving heat.

The retort A is preferably in communication with a hopper F. The hopper F is preferably inclined, the inclination being preferably somewhat steeper than that of the retort A. The hopper F is conveniently of the same strength and form as the retort A. Material may be admitted to the hopper F through a gate *f*. The gate *f* is enclosed in such manner as to tightly close the hopper F. The hot combustion gases from the furnace A preferably pass out through a flue G, surrounding the hopper F. The hot gases in the flue G serve to pre-heat the material in the hopper F, the hopper F thereby having the function of a pre-heater. The gases from the flue G may pass out through the chimney I.

In order to provide a clean separation between the ore in the retort and the ore in the pre-heater, a perforated gate J may be provided between the retort A and hopper F. The retort may be provided with a suitable pressure gauge and safety valve K and a pyrometer L.

In carrying out the present process, the retort A is charged with the ore, which is preferably crushed. The hopper or preheater F is also preferably filled. The retort A is then closed, so as to exclude air, as by closing the gate *a*, and closing the gate *f*. The gate J is also preferably closed. The material in the retort A is heated, with the exclusion of air, for the requisite time to break down the structure of the ore, and to bring the metal values therein, or certain of said values into a soluble state or condition. In the case of the ores containing aluminum together with sulphur radicals, capable of oxidation, the heating or roasting is done in such manner as to prevent the conversion of the aluminum from a sulphur compound and the formation of insoluble aluminum oxides. The exclusion of air prevents the oxidation of the compounds. The admission of such quantities of air as would simply raise the sulphur compound from a lower to a higher oxygen content, would not be objectionable, and may in some cases be desirable. Moreover, the temperature at which the ore is heated should not exceed a temperature which would disassociate the aluminum from its compound with sulphur or sulphur oxides. The heating is preferably carried out at an alum roast temperature.

After the heating is completed, the ore is preferably immediately dumped into water, in order to leach or dissolve the soluble aluminum, or other, compounds, which have been produced. The gate J serves to prevent the pre-heated ore falling into the retort during the emptying of the retort.

The aluminum and other soluble compounds may be separated and obtained in the form of crystals of dry salts in any suitable manner.

In the case of alunite, the heating is carried on, with the exclusion of air, at a temperature between 300° and 800° F., preferably at about 500°, but entirely depending on the product desired, and after the heating has been completed, the heated ore is dumped into water, all of the soluble potassium and aluminum being in the form of sulphates, and these dissolve in the heated water, leaving as tailings or residue the insoluble silicon and iron compounds. The solution of potassium and aluminum sulphates may be separated from the insoluble matter, and treated in any suitable manner to separate and recover the potassium and aluminum values. Preferably, however, the solution containing the aluminum and potassium sulphates is allowed to cool, or evaporate, to an extent which permits of potassium sulphate and aluminum sulphate crystallizing and precipitating as alum. The solution contains an excess of aluminum sulphate, and, after the crop of alum crystals has been removed, the solution is further evaporated to yield the aluminum sulphate. The aluminum sulphate may be utilized as an article of commerce or it may be calcined to produce a pure aluminum oxide, which may be substituted for bauxite in the electrolytic production of aluminum.

The alunite ore contains three molecules of aluminum sulphate to one of potassium sulphate. Two molecules of aluminum sulphate unite with the potassium sulphate to form alum, leaving one molecule recoverable as aluminum sulphate.

The water of crystallization contained within the ore, and which is driven off during the heating, is preferably confined within the retort, as it is found that the combined steam and pressure tend to facilitate the breaking up of the ore, and also it is found to materially reduce the period of heating. The use of a pre-heater or hopper in communication with the retort is especially desirable where the volatile constituents of the ore are to be confined, inasmuch as the pre-heater or hopper provides an expansion chamber into which the gases may expand. It also serves to hasten the pre-heating of the material in the pre-heater. According to the present process, pressures up to 100 pounds per square inch are practical, the higher pressures being preferred.

The apparatus of my invention may receive other embodiments than that specifically illustrated and described. Moreover, the process is capable of being modified without departing from the idea of the invention.

What I claim is:

1. A process of treating sulphur containing ores of aluminum, comprising heating the said ores with the exclusion of air.

2. A process of treating sulphur containing ores of aluminum, comprising heating the said ores under pressure with the exclusion of air.

3. A process of treating sulphur containing ores of aluminum, comprising heating the said ores with the exclusion of air and leaching.

4. A process of treating sulphur containing ores of aluminum, containing sulphuric acid compounds, comprising heating the said ores with the exclusion of air to form sulphate of aluminum.

5. A process of treating alunite, comprising heating the ore with the exclusion of air.

6. A process of treating alunite, comprising heating the ore under pressure with the exclusion of air.

7. A process of treating alunite, comprising roasting the ore with the exclusion of air, and continuing the heating until the potassium and aluminum are in the state of soluble sulphates.

8. A process of treating alunite, comprising heating the ore at temperatures between 400° and 600° F., with the exclusion of air.

9. A process of treating alunite, comprising heating the ore under pressure, at temperatures between 400° and 600° F., with the exclusion of air.

10. A process of treating alunite, comprising heating the ore under pressure, with the exclusion of air, leaching to dissolve the soluble sulphates formed, and treating the solution to extract crystals of alum therefrom.

11. A process of treating alunite, comprising heating the ore under pressure, with the exclusion of air, leaching to dissolve the soluble sulphates formed, treating the solution to extract crystals of alum therefrom, and evaporating the residue to separate the aluminum sulphate in said residue.

12. A process of treating ores, comprising confining the ores in a retort having a hopper or pre-heater in communication therewith, and heating said ores to a temperature which produces vaporization of volatile constituents, said vapors assisting in the conduction of heat to said ores in the retort and to the ores in the pre-heater.

In witness whereof, I have hereunto signed my name.

FLORENCE BRANDÉ MacCARTHY.